US010701316B1

(12) United States Patent
Cheung et al.

(10) Patent No.: US 10,701,316 B1
(45) Date of Patent: Jun. 30, 2020

(54) GESTURE-TRIGGERED OVERLAY ELEMENTS FOR VIDEO CONFERENCING

(71) Applicant: Facebook Technologies, LLC, Menlo Park, CA (US)

(72) Inventors: Vincent Charles Cheung, San Carlos, CA (US); Kent Austin White, Mountain View, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/599,070

(22) Filed: Oct. 10, 2019

(51) Int. Cl.
*G06F 3/01* (2006.01)
*H04N 7/15* (2006.01)

(52) U.S. Cl.
CPC .............. *H04N 7/15* (2013.01); *G06F 3/017* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,222,465 B1* | 4/2001 | Kumar | .................... | G06F 3/017 341/20 |
| 7,007,236 B2* | 2/2006 | Dempski | ................. | G06F 3/017 348/E7.083 |
| 2003/0067536 A1* | 4/2003 | Boulanger | ........... | H04N 13/158 348/14.08 |
| 2012/0249741 A1* | 10/2012 | Maciocci | ................ | G06F 3/011 348/46 |
| 2014/0206428 A1* | 7/2014 | Thompson | .......... | G07F 17/3204 463/20 |
| 2017/0280098 A1* | 9/2017 | Sethuraman | ............. | H04N 7/15 |
| 2018/0307405 A1* | 10/2018 | Dandekar | ............. | G06F 3/0482 |
| 2019/0057671 A1* | 2/2019 | Baer | ..................... | G06F 3/1446 |

* cited by examiner

*Primary Examiner* — Duc Nguyen
*Assistant Examiner* — Assad Mohammed
(74) *Attorney, Agent, or Firm* — Shumaker & Sieffert, P.A.

(57) ABSTRACT

A video conferencing system is described that includes an image capture system configured to capture image data of a participant in a video conferencing session, a pose tracker configured to track a pose of the participant based on the captured image data, a user interface (UI) element generator configured to generate a UI element, a rendering engine configured to render, based on the pose of the participant, at a position locked relative to a position of the participant in the image data, the UI element for display by the video conferencing system, a gesture detector configured to detect, from the image data, a gesture performed by the participant with respect to the rendered UI element, and a video conferencing application configured to perform an action in response to the gesture.

23 Claims, 9 Drawing Sheets

GESTURE-TRIGGERED OVERLAY ELEMENTS FOR VIDEO CONFERENCING

TECHNICAL FIELD

This disclosure generally relates to communication systems, and more particularly, to systems for video telephony.

BACKGROUND

Video telephony technology, including video conferencing, video chat software and services, etc. is becoming an increasingly popular way for friends, families, colleagues, and other groups of people to communicate with each other. Camera hardware, such as webcam hardware, is increasingly being added to various end-user modalities, such as smartphones, head-mounted devices (HMDs), tablet computers, laptop computers, network-connected televisions (or so-called "smart TVs"), digital displays (e.g., computer displays), whether as integrated hardware or as add-on hardware. The increasing addition of camera hardware to connected devices is increasing the ability to video conference with others using any of a number of online video telephony services. In addition, video telephony services are increasingly incorporating (or alternatively, are being incorporated into) multi-use communication services, such as collaborative document viewing and editing, etc.

SUMMARY

In general, this disclosure describes systems and techniques for rendering and displaying one or more virtual elements to a participant of a video telephony communications session. The systems and techniques of this disclosure may overlay the virtual element(s) on a video feedthrough displayed to the participant. As used herein, a "video feedthrough" refers to video that is output to the participant, and displays moving pictures of the participant himself/herself either in real time or substantially in real time (e.g., with a short time lag). Additionally, the systems of this disclosure may perform various actions in response to detecting a gesture that the participant performs in a real-world position that corresponds to the location of the virtual element(s) in the virtual space represented by the video feedthrough. In some implementations, the systems of this disclosure may perform different actions in response to detecting different gestures with respect to the virtual element(s) overlaid on the video feedthrough. For example, the systems may detect such gestures at, near the virtual elements(s), or within a boundary of the virtual element(s).

In one example, A video conferencing system includes an image capture system, a pose tracker, a user interface (UI) element generator, a rendering engine, a gesture detector, and a video conferencing application. The image capture system is configured to capture image data of a participant in a video conferencing session. The pose tracker is configured to track a pose of the participant based on the captured image data. The UI element generator is configured to generate a UI element. The rendering engine is configured to render, based on the pose of the participant, at a position locked relative to a position of the participant in the image data, the UI element for display by the video conferencing system. The gesture detector is configured to detect, from the image data, a gesture performed by the participant with respect to the rendered UI element. The video conferencing application is configured to perform an action in response to the gesture.

In another example, a method includes capturing, by an image capture system of a video conferencing system, image data of a participant in a video conferencing session, tracking, by a pose tracker of the video conferencing system, a pose of the participant based on the captured image data, and generating, by a user interface (UI) element generator of the video conferencing system, a UI element. The method further includes rendering, by a rendering engine of the video conferencing system, based on the pose of the participant, at a position locked relative to a position of the participant in the image data, the UI element for display by the video conferencing system, detecting, by a gesture detector of the video conferencing system, from the image data, a gesture performed by the participant with respect to the rendered UI element, and performing, by a video conferencing application executing on the video conferencing system, an action in response to the gesture.

In another example, a video conferencing apparatus includes means for capturing image data of a participant in a video conferencing session, means for tracking a pose of the participant based on the captured image data, and means for generating a UI element. The video conferencing apparatus further includes means for rendering, based on the pose of the participant, at a position locked relative to a position of the participant in the image data, the UI element for display by the video conferencing system, means for detecting, from the image data, a gesture performed by the participant with respect to the rendered UI element, and means for performing, via a video conferencing application executing on the video conferencing system, an action in response to the gesture.

In another example, this disclosure is directed to a non-transitory computer-readable storage medium encoded with instructions. The instructions, when executed, cause processing circuitry of a video conferencing system to capture, using an image capture system coupled to the video conferencing system, image data of a participant in a video conferencing session, to track a pose of the participant based on the captured image data, to generate a UI element, to render, based on the pose of the participant, at a position locked relative to a position of the participant in the image data, the UI element for display by the video conferencing system, to detect, from the image data, a gesture performed by the participant with respect to the rendered UI element, and to perform, via a video conferencing application executing on the video conferencing system, an action in response to the gesture.

The techniques and system configurations of this disclosure may be advantageous in scenarios in which the participant uses a mobile device, such as a smartphone or tablet computer, to participate in the video conferencing session, scenarios in which the participant is hands-free due to, e.g., to being located some distance from the video system, and scenarios in which the video conferencing system presents a limited user interface. For example, systems of this disclosure enable the participant to perform actions using gestures that do not require disruption of the video session or input using tactile input devices, such as a keyboard, mouse, touchpad, or button in order for the participant to provide input at the communication device. Systems of this disclosure may further provide a more pleasing and smoother user experience for the participant in a video conferencing session by enabling the participant to continue watching video while providing input. Video conferencing systems of this disclosure may provide high-quality communication experiences that participants can modify "on the fly" without disrupting the communication session, in a device-independent way. Accordingly, the techniques of the disclosure provide specific technical improvements to the computer-related field of video conferencing.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the drawings and description.

DETAILED DESCRIPTION

Figure 1:
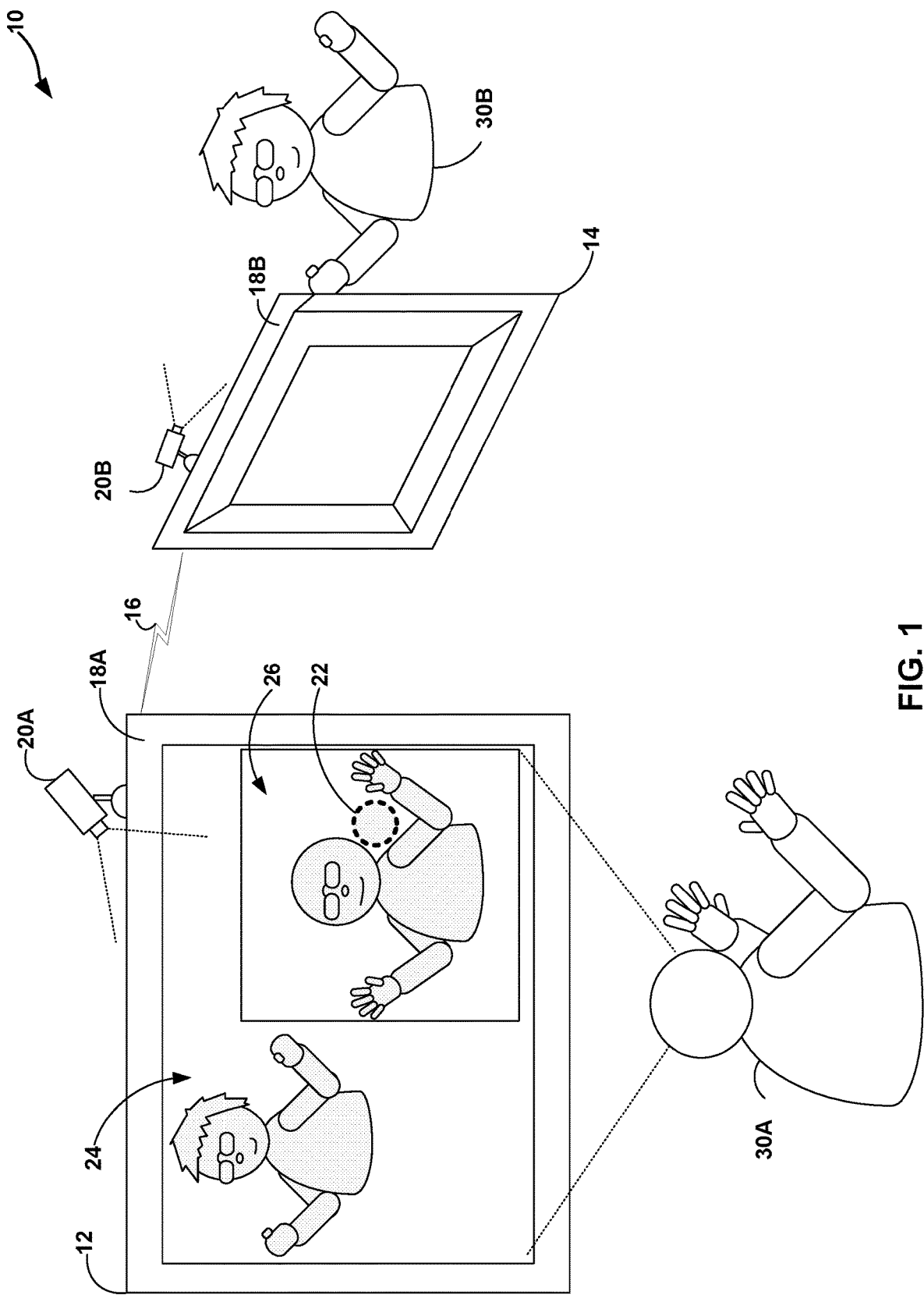
FIG. 1 is an illustration depicting an example video telephony system having video conferencing systems engaged in a video conferencing session, in accordance with the techniques of the disclosure.

Video telephony services, such as multi-use communication packages that include video conferencing components, perform various functionalities in addition to relaying video and audio data between the participants. For example, some multi-use communication packages present documents for shared viewing and real-time collaborative scrolling and editing during a video conferencing session. As another example, some multi-use communication packages are configured to add or remove participants in response to receiving certain predefined input communications from already-active participants in a video conferencing session. Typically, multi-use communication packages and/or video conferencing services require participants to provide these inputs using input devices or components of the end-user hardware modalities connected to the video conferencing session. Examples include touch inputs provided via touch-screens of smartphones or tablet computers, typing inputs entered using a keyboard, click inputs provided via a mouse or touchpad, etc.

Requiring participants in a video conferencing session to provide inputs using input devices or components of the video conferencing hardware modality may cause interruptions or disruptions to the video conferencing session already in progress. Additionally, requiring participants in a video conferencing session to provide inputs using input devices or components of the video conferencing hardware modality may introduce scope for errors, such as unintentional session terminations, etc. arising from errant button presses or other human error in handling the input devices/components.

The systems of this disclosure render virtual elements as overlays in the video feedthrough provided to a participant. Again, as used herein, the term "video feedthrough" refers to video that is output to the participant, and displays moving pictures of the participant himself/herself either in real time or substantially in real time (e.g., with a short time lag). The systems of this disclosure are configured to identify particular gestures performed by a video conference session participant at or adjacent to a physical location that corresponds to the location of the virtual element in the video feedthrough.

For example, the systems of this disclosure may detect a gesture with respect to a rendered virtual element or user interface (UI) element. For example, in response to detecting the performance of a gesture at a physical location corresponding to a virtual location touching the rendered UI element, within a boundary of the UI element, grasping (e.g. surrounding) the UI element, miming near the UI element, within a threshold distance of the UI element, etc., the systems of this disclosure may trigger various actions with respect to the video conferencing session. According to some implementations of the techniques of this disclosure, a video conferencing system may trigger a particular action selected from a multitude of possible actions, based on detecting a particular gesture selected from a predefined set of gestures. In this way, the systems of this disclosure may detect and respond to gestures in a granular way.

The techniques and system configurations of this disclosure provide specific technical improvements to the computer-related field of video conferencing and telephony. By enabling participants to effect changes using gesture inputs, the techniques of this disclosure mitigate or potentially eliminate disruptions of the in-progress video conferencing session that might otherwise arise from the participant needing to provide input using a touchscreen, keyboard, mouse, touchpad, or other input device or input component. Accordingly, the techniques of the disclosure enable video conferencing systems to provide high-quality communication experiences that participants can modify "on the fly" without disrupting the communication session, in a device-independent way. Additionally, the systems of this disclosure may render the virtual element only on the video feedthrough being fed back to a participant, and may omit the virtual element from the video conferencing feed provided to other participants, thereby providing an unaltered and relatively accurate depiction of a participant and the participant's surroundings to other participants of the video conferencing session.

While described primarily in the context of video telephony systems in this disclosure as an example, it will be appreciated that the techniques of this disclosure may implemented in other types of systems as well. For example, the gesture-based triggering techniques of this technique may be implemented in artificial reality systems. Artificial reality is a form of reality that has been adjusted in some manner before presentation to a user, and may include one or more of virtual reality (VR), augmented reality (AR), mixed reality (MR), hybrid reality, or some combination and/or derivative thereof. Artificial reality systems that incorporate the gesture-based triggering techniques of this disclosure may update and render artificial reality content output to a user via a head-mounted device (HMD) or other devices incorporating display hardware configured to display artificial reality content.

FIG. 1 is an illustration depicting an example video telephony system 10 having video conferencing systems 12, 14 engaged in a video conferencing session. Video conferencing systems 12, 14 of FIG. 1 are shown for purposes of example, and may represent any of a variety of devices with video conferencing capabilities, such as a mobile computing device, laptop, tablet computer, smartphone, server, stand-alone tabletop device, wearable device (e.g., smart glasses, an artificial reality HMD, or a smart watch) or dedicated video conferencing equipment. As described herein, at least one of video conferencing systems 12, 14 is configured to render a user interface (UI) element 22 in a video feedthrough to a video conferencing participant using the respective video conferencing system, and to trigger one or more actions in the context of the video conferencing session in response to detecting one or more gestures performed by user 30A with respect to the UI element 22.

In the example of FIG. 1, video telephony system 10 includes a first video conferencing system 12 connected to a second video conferencing system 14 over a communications channel 16. Each video conferencing system 12, 14 includes one of displays 18A-18B and image capture systems 20A-20B. Each of image capture systems 20 is equipped with image capture capabilities (often supplemented with, and sometimes incorporating, one or more microphones providing voice capture capabilities). Each of image capture systems 20 includes camera hardware configured to capture still images and moving pictures of the surrounding environment.

Video telephony system 10 may in some cases be in communication, via a network, with one or more compute nodes (not shown) that correspond to computing resources in any form. Each of the compute nodes may be a physical computing device or may be a component of a cloud computing system, server farm, and/or server cluster (or portion thereof) that provides services to client devices and other devices or systems. Accordingly, any such compute nodes may represent physical computing devices, virtual computing devices, virtual machines, containers, and/or other virtualized computing device. The compute nodes may receive, process, and output video to perform techniques described herein.

In the example shown in FIG. 1, a participant 30A uses video conferencing system 12 to communicate with a participant 30B operating video conferencing system 14. In the example shown in FIG. 1, video conferencing system 12 includes a display 18A, and an image capture system 20A. Video conferencing system 14 includes a display 18B and an image capture system 20B. In various implementations, image capture system 20A and display 18A may be included in a single device or may be separated into separate devices.

Displays 18 and image capture systems 20 are configured to operate as video communication equipment for video conferencing systems 12, 14. That is, participants 30A and 30B may communicate with one another in a video conferencing session over communications channel 16 using displays 18 and image capture systems 20. Image capture systems 20A and 20B capture still and/or moving pictures of participants 30A and 30B respectively. Computing hardware and network interface hardware of video conferencing systems 12 and 14 process and transmit the captured images substantially in real time over communications channel 16, which may be implemented over a private network (e.g., a local area network or LAN), a public network (e.g., the Internet), a private connection implemented on public network infrastructure (e.g., a virtual private network or VPN tunnel implemented over an Internet connection), etc. Network interface hardware and computing hardware of the video conferencing systems 12 and 14 receive and process the images (e.g., video streams) transmitted over communications channel 16. Displays 18 are configured to output image data (e.g., still images and/or video feeds) to participants 30, using the image data received over communications channel 16 and processed locally for rendering and output.

In this way, video conferencing systems 12 and 14, by way of image capture systems 20, displays 18 (as well as microphone hardware and audio output hardware) enable participants 30 to engage in a video conferencing session. While the video conferencing session implemented over video telephony system 10 is illustrated as including two participants in FIG. 1 as one non-limiting example, it will be appreciated that the systems and techniques of this disclosure are scalable, in that video conferencing sessions of this disclosure may accommodate three or more participants in some scenarios. The systems and techniques of this disclosure are also compatible with video conferencing sessions with in-session variance in terms of the number of participants, such as video conferencing sessions in which one or more participants are added and removed throughout the lifetime of the session.

In the example of FIG. 1, display 18A outputs display content 24 to participant 30A. Display content 24 represents a still frame of a moving video sequence output to participant 30A as part of the video conferencing session presently in progress. Display content 24 includes a visual representation of participant 30B, who is a complementing participant to participant 30A in the video conferencing session. Display content 24 also includes video feedthrough 26. Video feedthrough 26 is displayed to participant 30A to provide an indication of how the image data captured by image capture system 20A appears to other users in the video conferencing session, such as to participant 30B via display 18B. As such, video feedthrough 26 provides participant 30A with a low-to-zero time-lagged representation of the image data attributed to the surroundings of video conferencing system 12 and displayed to other participants in the video conferencing session.

According to the techniques of this disclosure, video conferencing system 12 displays a user interface (UI) element 22 as an overlay with respect to a portion of video feedthrough 26. A video conferencing application executing locally at video conferencing system 12 or at one or more remote compute nodes may be configured, according aspects of this disclosure, to render UI element 22 as an overlay on video feedthrough 26. While several different systems or modules may be configured to render and overlay UI 22 on video feedthrough 26, examples are described below attributing these functionalities of this disclosure to a video conferencing application running locally at video conferencing system 12, and termed as being performed by video conferencing system 12.

Video conferencing system 12 may use image data captured by image capture system 12 to track a pose (e.g., body position) of participant 30A. Video conferencing system 12 may render UI element 22 at a position 'locked' relative to the body position of a visual representation of participant 30A shown in video feedthrough 26. As used herein, a UI element 'locked' to a position of a visual representation of a physical object is rendered at a position relative to the position of the physical object (or part thereof) so as to appear to be part of or otherwise tied in the video to the physical object (or part thereof).

In the particular example of FIG. 1, video conferencing system 12 renders UI element 22 above a left shoulder area of the visual representation of participant 30A in video feedthrough 26. UI element 22 may be locked to the body, torso, head, and/or left shoulder of participant 30A. In other implementations, video conferencing system 12 may render UI element 22 at a different location of video feedthrough 26 relative to the body position of participant 30A as reflected in video feedthrough 26, such as on or above the head of participant 30A, on a torso or article of clothing of participant 30A, locked to a hand of participant 30A, and so forth. This disclosure primarily describes the UI element rendering techniques as being implemented with respect to a position above a visual representation of the left shoulder of a user, purely as a non-limiting example for ease of discussion purposes.

In some examples, video conferencing system 12 may implement pose tracking, motion tracking, or other image processing-based tracking techniques to determine the position of the left shoulder of participant 30A. In these examples, video conferencing system 12 may dynamically update the rendering and display of UI element 22, such that UI element 22 tracks any translational, skew, or rotational motion of a visual representation of the left shoulder of participant 30A as displayed in the video data sequence of video feedthrough 26. According to various examples of this disclosure, video conferencing system 12 may overlay UI element 22 only in video feedthrough 26, without transmitting data representative of UI element 22 over communications channel 16 to video conferencing system 14 or other end-user hardware modalities actively connected to the video conferencing session in progress.

In this way, video conferencing system 12 renders and displays UI element 22 in video feedthrough 26 to simulate an "assistant" element or "drone" or "floating button" that accompanies (e.g., by hovering over the left shoulder of) or is otherwise visually locked to the visual representation of participant 30A, whether stationary or in motion, within video feedthrough 26. Video conferencing system 12 may be configured to perform gesture detection. According to aspects of this disclosure, video conferencing system 12 may detect certain predefined gestures performed by participant 30A with respect to UI element 22. For example, video conferencing system 12 may detect gestures performed by participant 30A at positions in the physical environment corresponding to the virtual position of UI element 22 within display content 24. For example, UI element 22 being virtually located above the left shoulder of participant 30A, a positions in the physical environment corresponding to the positions of UI element 22 within display content 24 would include the area of the left shoulder of participant 30A or otherwise in a line of sight from the image capture system 20A to the left shoulder of participant 30A. In some examples, a gesture performed with respect to UI element 22 is a gesture in which a representation of some part of a hand or the entire hand of participant 30A is within UI element 22 or otherwise overlapping with element 22.

Responsive to detecting a gesture performed by participant 30A with respect to UI element 22, video conferencing system 12 may trigger one or more actions with respect to the video conference in progress. In some granular implementations, video conferencing system 12 may trigger different actions in response to identifying different gestures performed with respect to UI element 22.

Examples of gestures that video conferencing system 12 may detect for triggering an action may include a grasp (e.g, fist-making, pincer grip, pinch grip, grab, etc.) gesture, a poke (e.g. single digit extension and, optionally, a translational movement of the hand with the single digit extended, or simply a translational movement of the hand in any configuration) gesture, a rotation gesture, a hand-wave gesture, a wiggling gesture (with respect to one or more individual digits), a hover (e.g. substantially stationary hand placement for at least a threshold period of time) gesture, a flip (e.g., 180-degree reflection caused by a turn motion or turning motion around a vertical axis) gesture, and various others. Examples of actions cation video conferencing system 12 may implement in response to detecting one or more of the above-described gestures within the boundary of UI element 22 include, but are not limited to, gating menus that enable participant 30A to add a new participant to the video conferencing session or to select other menu options, scrolling or otherwise advancing (e.g., via page replacement or virtual page turning) of a document being shared or collaboratively viewed over the video conferencing session, and numerous others.

Figure 2:
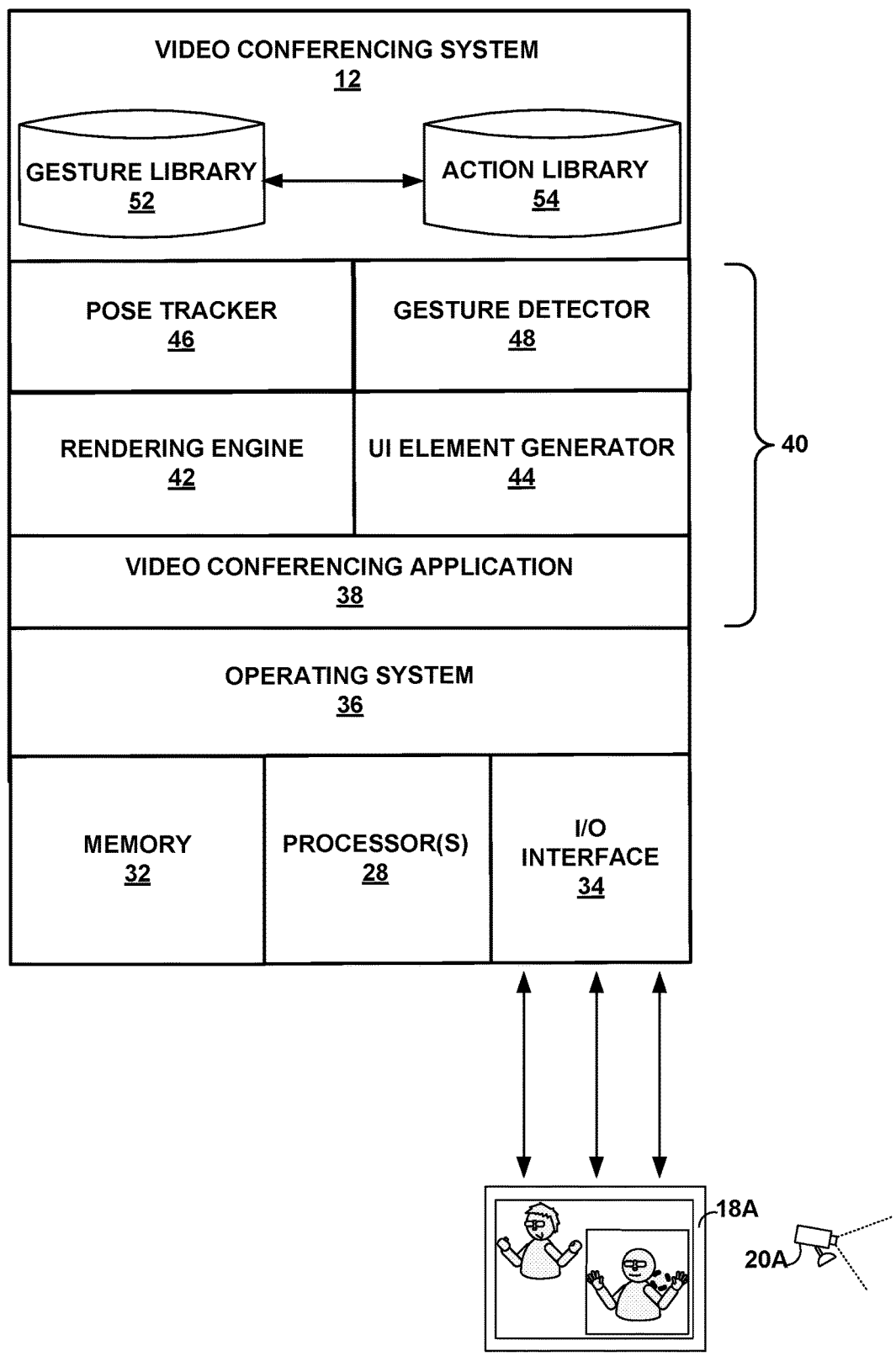
FIG. 2 is a block diagram illustrating an example video conferencing system that implements gesture-triggered actions in accordance with the techniques of the disclosure.

FIG. 2 is a block diagram illustrating an example of a video conferencing system that implements gesture-triggered actions in accordance with the techniques of the disclosure. While a number of different devices may be configured to perform the techniques described herein, FIG. 2 is described with reference to the non-limiting example of video conferencing system 12 of FIG. 1.

In the example shown in FIG. 2, video conferencing system 12 includes memory 32 and one or more processors 28 communicatively connected to memory 32. In some examples, memory 32 and processor(s) 28 may be integrated into a single hardware unit, such as a system on a chip (SoC). Each of processors 28 may comprise one or more of a multi-core processor, a controller, a digital signal processor (DSP), an application specific integrated circuit (ASIC), a field-programmable gate array (FPGA), processing circuitry (e.g., fixed function circuitry, programmable circuitry, or any combination of fixed function circuitry and programmable circuitry) or equivalent discrete logic circuitry or integrated logic circuitry. Memory 32 may include any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Memory 32 and processor(s) 28 provide a computer platform for executing operation system 36. In turn, operating system 36 provides a multitasking operating environment for executing one or more software components 40. As shown, processors 28 connect via an I/O interface 34 to external systems and devices, such as to display 12, image capture system 20A, and the like. Moreover, I/O interface 34 may incorporate network interface hardware, such as one or more wired and/or wireless network interface controllers (NICs) for communicating via communication channel 16, which may represent a packet-based network.

Software components 40 of video conferencing system 12, in the particular example of FIG. 2, include video conferencing application 38, rendering engine 42, user interface (UI) generator 44, pose tracker 46, and gesture detector 48. In some example approaches, software components 40 represent executable software instructions that may take the form of one or more software applications, software packages, software libraries, hardware drivers, and/or Application Program Interfaces (APIs). Moreover, any of software components 40 may display configuration menus on display 18A or other such display for receiving configuration information.

Video conferencing application 38 implements functionalities that enable participation in a video conferencing session over communication channel 16 using video conferencing system 12 as an end-user hardware modality. Video conferencing application 38 includes functionality to provide and present a video conferencing session between two or more participants 30. For example, video conferencing application 38 receives an inbound stream of audio data and video data from video conferencing system 14 and presents, via I/O interface 34, the audio and video data to participant 30A via, for example, an audio output device (e.g., speakers) and display 18A, respectively. Video data presented to participant 30 by video conferencing application 38 is shown generally in FIG. 2 as display content 24 presented by display 18A. Similarly, video conferencing application 38 captures audio data by a microphone and image data by image capture system 20A and transmits the audio/video data to video conferencing system 14 for presenting to participant 30B. Video conferencing application 38 may include, for example, one or more software packages, software libraries, hardware drivers, and/or Application Program Interfaces (APIs) for implementing the video conferencing session.

For example, video conferencing application 38 may process image data received from image capture system 20A and audio data received from microphone hardware of or coupled to I/O interface 34, and relay the processed video and audio feeds over communications channel 16 to other end-user hardware modalities connected to the in-progress video conferencing session. Additionally, video conferencing application 38 may process video and audio feeds received over communications channel 16 as part of the video conferencing session, and may enable other components of video conferencing system 12 to output the processed video and audio data via display 18A and loudspeaker/headphone hardware of or coupled to I/O interface 34.

Rendering engine 42 constructs visual content to be output by display 18A, using video data received over communications channel 16 and processed by video conferencing application 38. In some examples, rendering engine 42 constructs content to include multiple video feeds, as in the picture-in-picture example of display content 24 illustrated in FIG. 1. In the example of FIG. 1, rendering engine 42 constructs display content 24 to include one video stream reflecting video data received from video presence device 18B over communications channel 16, and a second video stream (in the form of video feedthrough 26) reflecting video data received locally from image capture system 20A. In some examples, rendering engine 42 may construct display content 24 to include sections representing three or more video feeds, such as individual video feeds of two or more remote participants, in addition to video feedthrough 26.

Pose tracker 46 operates on video data received from image capture system 20A, such as moving video of participant 30A, to track the body position and configuration, changes thereto, physical movement of participant 30A, etc. In some examples, such as in the use case described with respect to FIG. 1, pose tracker 46 may track the location, distance, positioning, orientation, etc. of the left shoulder of participant 30A. Pose tracker 30A may use various attributes of the images received from image capture system 20A and processed by video conferencing application 38. As examples, pose tracker 30A may detect shoulder-indicative curvature information, detect a space to the left of the left ear of participant 30A, etc.

Video conferencing application 38 may invoke UI element generator 44 to generate UI element 22 shown in FIG. 1. UI element generator 44 may use information received from pose tracker 46 to determine a location within video feedthrough 26 at which to overlay UI element 22. UI element generator 44 may dynamically update the location at which UI element 22 is to be overlaid within video feedthrough 26, based on dynamic updates received from pose tracker 46 with respect to the position information of the left shoulder of participant 30A.

Using information received from UI element generator 44, rendering engine 42 may render UI element 22 relative to the position/pose of the left shoulder of participant 30A as tracked by pose tracker 46. Rendering engine 22 dynamically updates the location at which UI element 22 is rendered within video feedthrough 26, based on dynamic updates received from UI element generator 44. In this way, pose tracker 46, UI element generator 44, and rendering engine 42 collaborate to output and move UI element 22 within video feedthrough 26, to simulate an "assistant" element that moves with participant 30A, or a "drone" that hovers over the left shoulder of participant 30A, as participant 30A is represented in video feedthrough 26.

Gesture detector 48 analyzes the moving image data received from image capture system 20A to discern movements/motions, configurations, positions, and/or orientations of objects (e.g., hands, arms, wrists, fingers, palms, thumbs of participant 30A) of the user to identify one or more gestures performed by participant 30A. According to the examples described herein, gesture detector 48 analyzes objects recognized within moving picture data captured by image capture system 20A, and to track movements of the left hand (and/or individual digits thereof) relative to the virtual position of the boundary of UI element 22 to identify gestures performed by participant 30A within the boundary of UI element 22.

Gesture detector 48 may track movement, including changes to position and orientation, by comparing motion vectors of the objects of the image data to one or more entries in gesture library 52 to detect a gesture or combination of gestures performed by participant 30A within the boundary of UI element 22. Various entries in gesture library 52 may each define a gesture as a series or pattern of motion, such as a relative path or spatial translations and rotations of a user's hand, specific fingers, thumbs, wrists and/or arms. Some entries in gesture library 52 may each define a gesture as one or more of a movement, stasis, configuration, position, and/or orientation of the hand (or individual digits thereof) at a particular time, or over a period of time. Gesture library 52 may include other examples of gesture types, as well, in some instances. Each of the entries in gesture library 52 may specify, for the defined gesture or combination of gestures, conditions that, if met, cause video conferencing application 38 to trigger a particular action or response.

In some examples, in accordance with the techniques of this disclosure, if gesture detector 48 determines that one or more gestures within the boundary of UI element 22 (as reflected in the moving picture data received from image capture system 20A and shown in video feedthrough 26) match corresponding entry(ies) in gesture library 52, video conferencing application may perform certain corresponding actions/responses in the context of the video conferencing session. In some examples, video conferencing application 38 may map particular entries of gesture library 52 to corresponding entries in action library 54.

In one example, if gesture detector 48 matches an identified gesture to a "flip" gesture entry of gesture library 52, video conferencing application 38 may select a "page advance" action from action library 54. For example, video conference application 38 may apply the page advance action selected from action library 54 to flip or scroll to the next page of a document (e.g., a virtual story book) being collaboratively viewed within the context of the in-progress video conferencing session. Using the page advance action selected from action library 54, in one use case scenario, a parent can advance to a next page of a virtual story book when reading a story to a child, using the video conferencing session to which video conferencing system 12 is connected.

In other examples, video conferencing application 38 may select triggering (or "gating" or "invocation") with respect to other UI elements from action library 54, in response to gesture detector 48 detecting a certain predefined gesture within the boundary of UI element 22. For instance, video conferencing application 38 may gate one or more interactive menus in response to detector 48 detecting, within the boundary of UI element 22, a certain predefined gesture of gesture library 52. The interactive menu(s) gated by video conferencing application 38 based on entries in action library 54 in this way may provide participant 30A various options, such as to add another participant to the video conferencing session in progress, to launch in-session applications, to provide text and/or free form inputs to the video data being shown to participant 30B or other participants, etc.

While gesture library 52 may include various types of entries, this disclosure primarily describes entries that correspond to hand gestures (e.g., movement of a single hand, fingers thereof, fingertips thereof, etc.) within the boundary of UI element 22 as non-limiting examples. In accordance with some examples of this disclosure, gesture library 52 may include entries corresponding to a poke gesture (e.g., an actuation of the hand of participant 30A with one finger or two fingers extended) within or partially within the boundary of UI element 22. Gesture library 52 may, in some examples, include entries corresponding to a "grasp" gesture, which entails an adduction motion of two or more digits of the hand towards a central region of the palm of the hand. Some examples of grasp gestures include gestures in which the digits are adduced without making contact with the palm and/or without making contact with one another. Other examples of grasp gestures of this disclosure include "gripping" or "grabbing" gestures, such as a tip-to-tip contact between a thumb and one or more other fingers (a "pincer" grip) of the hand within the boundary of UI element 22, a pad-to-pad contact between the thumb and one or more other fingers (a "pinch" grip) of the hand within the boundary of UI element 22, a clenching motion/movement of the hand to form a grasp configuration within the boundary of UI element 22, etc.

Gesture library 52 may, in some examples, include entries corresponding to rotational movement (or "roll") of the hand within the boundary of UI element 22. In some examples, gesture library 52 includes entries corresponding to a "wave" movement or "waving" movement" ("yaw" or "pitch") of the hand within the boundary of UI element 22. In some examples, gesture library 52 includes entries corresponding to a "wiggling" movement of individual digits of the hand within the boundary of UI element 22. Gesture library 52 may also include entries corresponding to a "hover" gesture, which gesture detector 48 may detect based on a stasis of the hand in a particular position (e.g., digits extended with palm facing forward) within the boundary of UI element 22 for at least a threshold period of time.

According to some implementations of the techniques described herein, video conferencing application 38 may identify a different entry of action library 54 based on gesture detector 48 detecting a different one of the predefined gestures of gesture library 52 described above. Video conferencing application 38 may thus use UI element 22 in a polymorphic way according to some examples of this disclosure, in that video conferencing application 38 uses UI element 22 as a single interface to the invocation of multiple different actions reflected in action library 54, in response to gesture detector 48 detecting different gestures included in gesture library 52 based on image data received from image capture system 20A.

Pose tracker 46 and gesture detector 48 are described herein as detecting various poses, gestures, and positions based on "angles" or other geometric terms as applied to the hand or body of participant 30A, as represented in the image data received from image capture system 20A. It will be appreciated that pose tracker 46 and gesture detector 48 perform angle determinations and other determinations described in geometric terms in this disclosure to accommodate human anatomical idiosyncrasies, such as the curvature and folding of the webbing of the human hand, the curvature of the human shoulder, neck and head, natural bends exhibited by human joints, etc.

Figure 3:
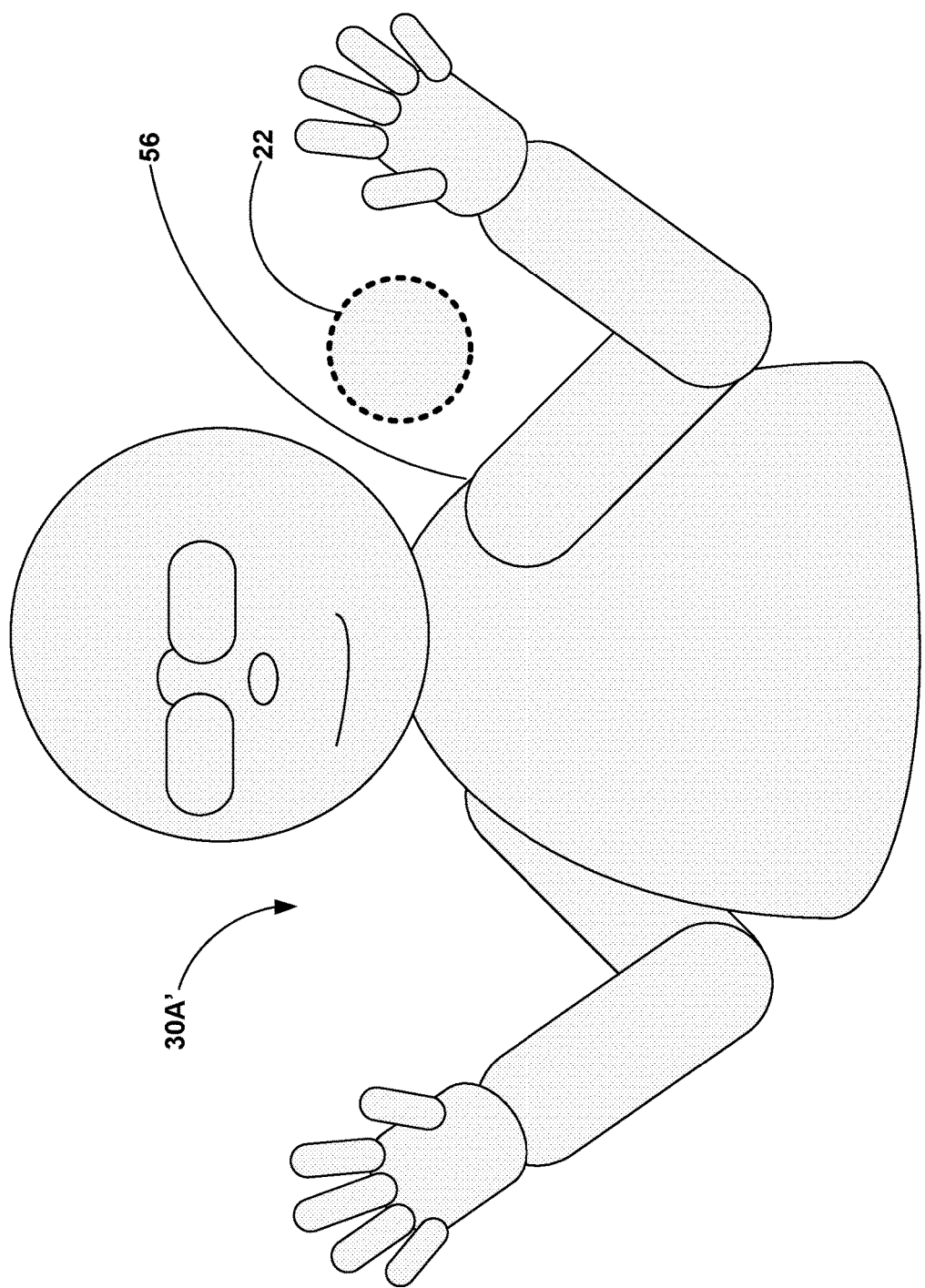
FIG. 3 is a is a conceptual diagram illustrating an avatar, which is a visual representation of the torso and face of a participant of the video conferencing session of FIG. 1 as displayed in the video feedthrough of FIG. 1.

FIG. 3 is a conceptual diagram illustrating avatar 30A', which is a visual representation of the torso and face of participant 30A of FIG. 1 as displayed in video feedthrough 26. Pose tracker 46 may detect the position and/or orientation of left shoulder 56 of avatar 30A' based on image data (e.g., moving video data) received from image capture system 20A. Pose tracker 46 may discern the position of left shoulder 56 by analyzing angles and/or curvatures of avatar 30A', by using facial recognition to identify the face of avatar 30A' and computing a vector displacement (magnitude and direction) to the position of left shoulder 56, stick-figure analysis, or in various other ways.

UI element generator 44 causes rendering engine 42 to output UI element 22 above left shoulder 56 in video feedthrough 26, based on the position and orientation of left shoulder 56 as determined by pose tracker 46. UI element generator 44 and rendering engine 42 may dynamically update the position of UI element 22 within video feedthrough 26, based on any movements of participant 30A, as discerned by pose tracker 46 from the moving video data received from image capture system 20A. In this way, UI element generator 44 and rendering engine 42 may output UI element 22 within video feedthrough 26 to simulate a personal assistant or drone that hovers over the left shoulder of avatar 30A', while tracking the movements and position changes of participant 30A substantially in real time.

Figure 4:
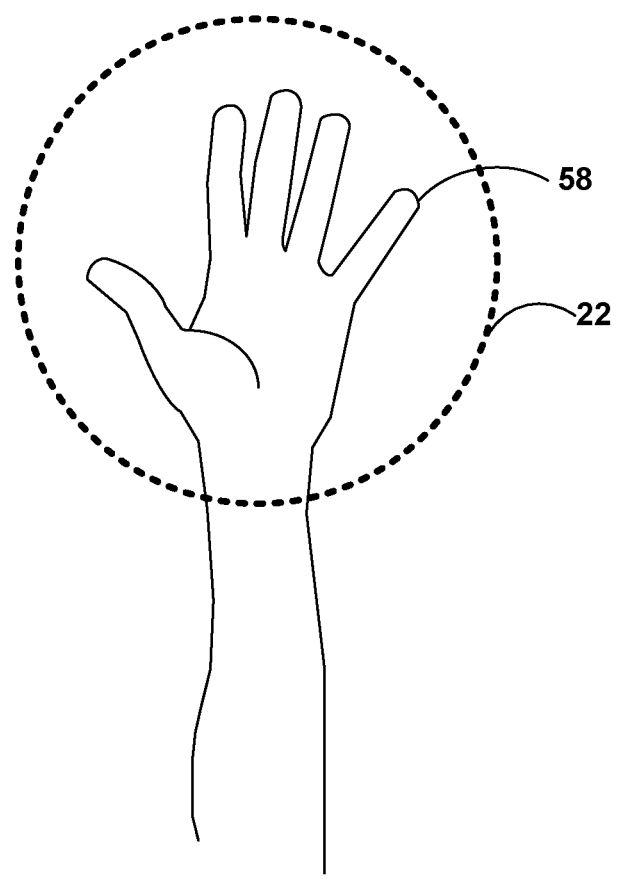
FIG. 4 is a conceptual diagram illustrating an open hand configuration within the boundary of the UI element of FIGS. 1 and 3.

FIG. 4 is a conceptual diagram illustrating an open hand configuration 58 within the boundary of UI element 22. Gesture detector 48 may identify open hand configuration 58 as a portion of various gestures included in gesture library 52. Gesture detector 48 identifies open hand configuration 58 based on an extended or substantially extended state of all of the digits of the hand, and a forward-facing palm positioning of the hand within the boundary of UI element 22. In one example, gesture detector 48 may identify open hand configuration 58 within the boundary of UI element 22 as a snapshot or still frame (e.g., received as part of moving pictures received from image capture system 20A) that forms a portion of a hover gesture included as an entry of gesture library 52. While gesture detection is primarily described herein with respect to gestures performed within a boundary of UI element 22, gestures performed with respect to a UI element may include gestures performed within a threshold distance of the UI element. The threshold distance may be a physical distance, a number of pixels, a virtual distance, or other measurement. As noted above, the position at which a gesture is performed in physical space corresponds to a position in video feedthrough 26.

In the example of a hover gesture, gesture detector 48 may detect the gesture based on open hand configuration 58 remaining stationary or substantially stationary for a threshold period of time. If gesture detector 48 determines that open hand configuration 58 remains substantially stationary within the boundary of UI element 22 for at least the threshold period of time, video conferencing application 38 may select and perform an action included in action library 54 that maps to the hover gesture entry of gesture library 52. In the case of a flip gesture, gesture detector 48 may detect a reflection motion of the hand (e.g., a turn around a vertical axis or plane), starting from open hand configuration 58, and ending with the back of the hand facing outward, with all of the digits of the hand extended or substantially extended.

In another example, may identify open hand configuration 58 as a snapshot or still frame that forms a starting point of a number of divergent gestures, such as a clenching movement to form a grasp configuration, a flip gesture, a wave gesture, a wiggle gesture, a pincer grip gesture, a pinch gesture, a flap gesture, or various others. Gesture detector 48 may identify a wave gesture of gesture library 52 occurring or originating within the boundary of UI element 22 in response to detecting a change or movement in the yaw angle of the hand. Gesture detector 48 may identify a flap gesture of gesture library 52 occurring or originating within the boundary of UI element 22 in response to detecting a change or movement in the pitch angle of the hand, ending with less of the palm facing image capture system 20A and with more of the fingertips of the hand facing image capture system 20A.

To identify a pincer grip gesture of gesture library 52, gesture detector 48 may detect an adduction movement of the thumb and at least one (sometimes more than one) other finger(s) of the hand, ending with a tip-to-tip contact between the thumb and other finger(s) of the hand. In the case of identifying a pinch grip gesture of gesture library 52, gesture detector 48 may detect an adduction movement of the thumb and at least one (sometimes more than one) other finger(s) of the hand, ending with a pad-to-pad contact between the thumb and other finger(s) of the hand. With respect to identifying a wiggle gesture, gesture detector 48 may detect a forward-backward undulating movement of one or more fingers of the hand within the boundary of UI element 22.

Figure 5:
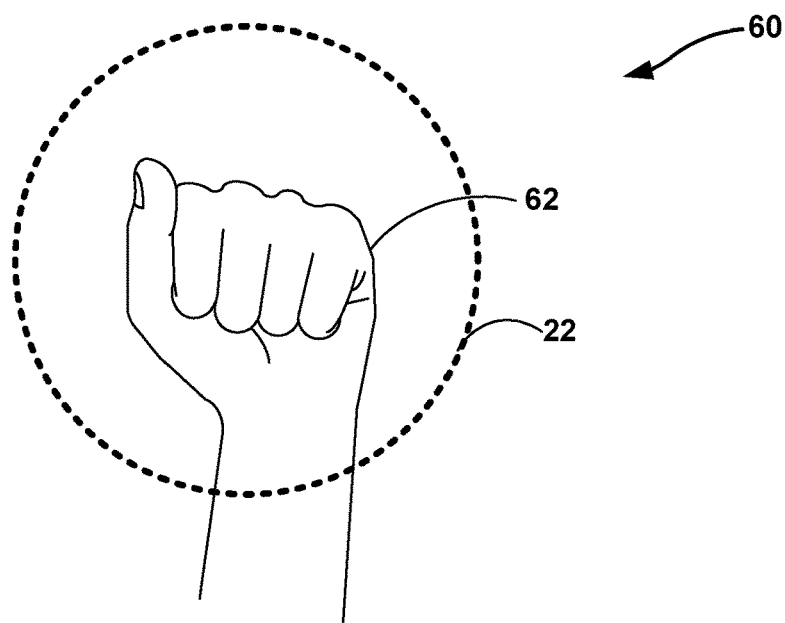
FIG. 5 is a conceptual diagram illustrating a grasp gesture that the gesture detector of FIG. 2 may detect based on matching an entry in the gesture library of FIG. 2, in accordance with aspects of this disclosure.

FIG. 5 is a conceptual diagram illustrating a grasp gesture 60 (more specifically a fist-making gesture in this example) that gesture detector 48 may detect based on matching an entry in gesture library 52, in accordance with aspects of this disclosure. To detect grasp gesture 60, gesture detector 48 may detect, starting from open hand configuration 58 of FIG. 4, an adduction motion of all of the digits towards the center or central region of the palm of the hand. The adduction motion of all of the digits towards the central region of the palm of the hand is described herein as a "clenching" motion of the hand. Gesture detector 48 detects grasp configuration 62 of the hand within the boundary of UI element 22 to identify the completion of the clenching motion of the hand within the boundary of UI element 22.

The adduction motion of all of the digits towards the central region of the palm of the hand is described herein as a "clenching" motion of the hand, although it will be appreciated that the adduction motion may be of a lesser magnitude, and may form a "claw" grip or incomplete arch of the hand in some examples. Gesture detector 48 detects grasp configuration 62 of the hand within the boundary of UI element 22 to identify the completion of the clenching motion of the hand within the boundary of UI element 22, partially within the boundary of UI element 22, around the boundary of UI element 22 (e.g. to simulate holding a ball), etc.

Figure 6:
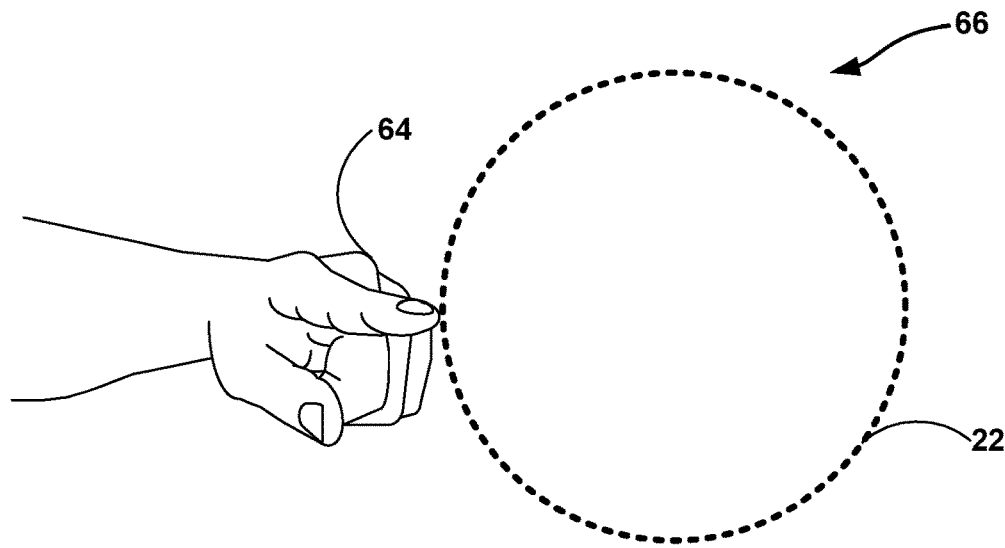
FIG. 6 is a conceptual diagram illustrating a poke gesture that the gesture detector of FIG. 2 may detect based on matching an entry in the gesture library of FIG. 2, in accordance with aspects of this disclosure.

FIG. 6 is a conceptual diagram illustrating a poke gesture 66 that gesture detector 48 may detect based on matching an entry in gesture library 52, in accordance with aspects of this disclosure. To identify poke gesture 66, gesture detector 48 may detect an extension of a single digit (in this case, the index finger) to form pointing configuration 64, and an actuating motion of the hand in pointing configuration 64 within a threshold distance from the boundary of UI element 22. For example, gesture detector 48 may identify poke gesture 66 based on the hand, while in pointing configuration 64, moving towards image capture system 20A or in parallel to the field of view (FoV) of lens hardware of image capture system 20A, while still in an area that corresponds to the virtual location of UI element 22 in video feedthrough 26. In some examples, gesture detector 48 may detect pointing configuration 64 in response to detecting two fingers being extended from an otherwise closed fist, or based on other criteria. In some examples, gesture detector 48 may detect poke gesture 66 based on an actuation motion that begins outside of the boundary of UI element 22 and terminates by contacting the boundary of UI element 22, as in the illustration of FIG. 6.

Figure 7:
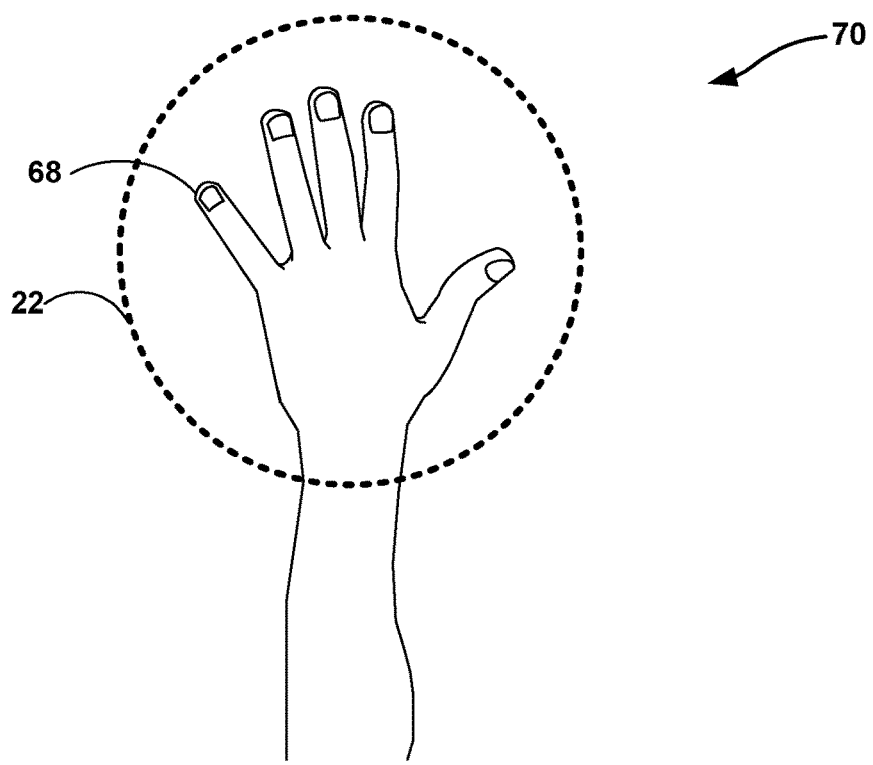
FIG. 7 is a conceptual diagram illustrating a flip gesture that the gesture detector of FIG. 2 may detect based on matching an entry in the gesture library of FIG. 2, in accordance with aspects of this disclosure.

FIG. 7 is a conceptual diagram illustrating a flip gesture 70 that gesture detector 48 may detect based on matching an entry in gesture library 52, in accordance with aspects of this disclosure. To detect flip gesture 70, gesture detector 48 may detect, starting from open hand configuration 58 of FIG. 4, a reflection motion (e.g., an approximate 180-degree rotation or turn motion around a vertical axis) of the hand within the boundary of UI element 22. Gesture detector 48 may detect the completion of flip gesture 70 by identifying backhand configuration 68 of the hand within the boundary of UI element 22. Video conferencing application 38 may select and trigger one or more entries of action library 54 based on gesture detector 48 detecting flip gesture 70, such as advancing to a next page of content being shared in text form, advancing to a next screen, advancing through a list of events or calendar items, etc.

Figure 8:
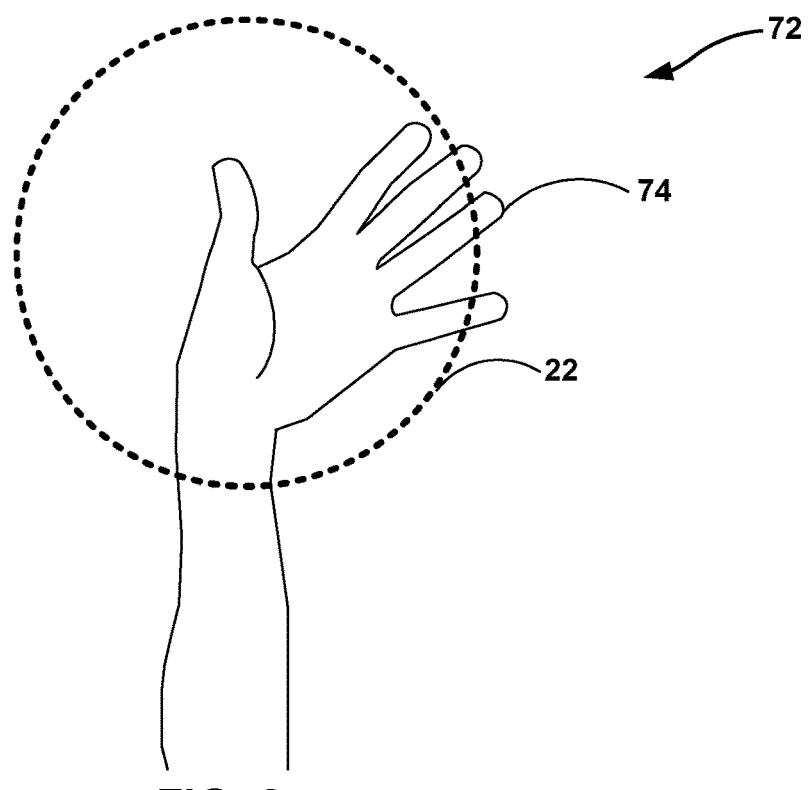
FIG. 8 is a conceptual diagram illustrating a rotation gesture that the gesture detector of FIG. 2 may detect based on matching an entry in the gesture library of FIG. 2, in accordance with aspects of this disclosure.

FIG. 8 is a conceptual diagram illustrating a rotation gesture 72 that gesture detector 48 may detect based on matching an entry in gesture library 52, in accordance with aspects of this disclosure. To detect rotation gesture 70, gesture detector 48 may detect, starting from the substantially upright orientation of open hand configuration 58 of FIG. 4, a rotation motion (e.g., a radial movement around a depth axis or so-called "z-axis") of the hand within the boundary of UI element 22. In the particular example of FIG. 8, gesture detector 48 detects rotation gesture 72 based on a clockwise rotational motion ending with the orientation shown with respect to rotated hand 74 within the boundary of UI element 22. In other examples, gesture detector 48 may detect a rotation-based gesture based on a counterclockwise rotational motion of the hand within the boundary of UI element 22, as well. In the example of FIG. 8, gesture detector 48 identifies rotation gesture 72 based on a rotational movement that ends with a portion of rotated hand configuration 74 falling outside the boundary of UI element 22, and a portion of rotated hand configuration 74 being within the boundary of UI element 22.

Figure 9:
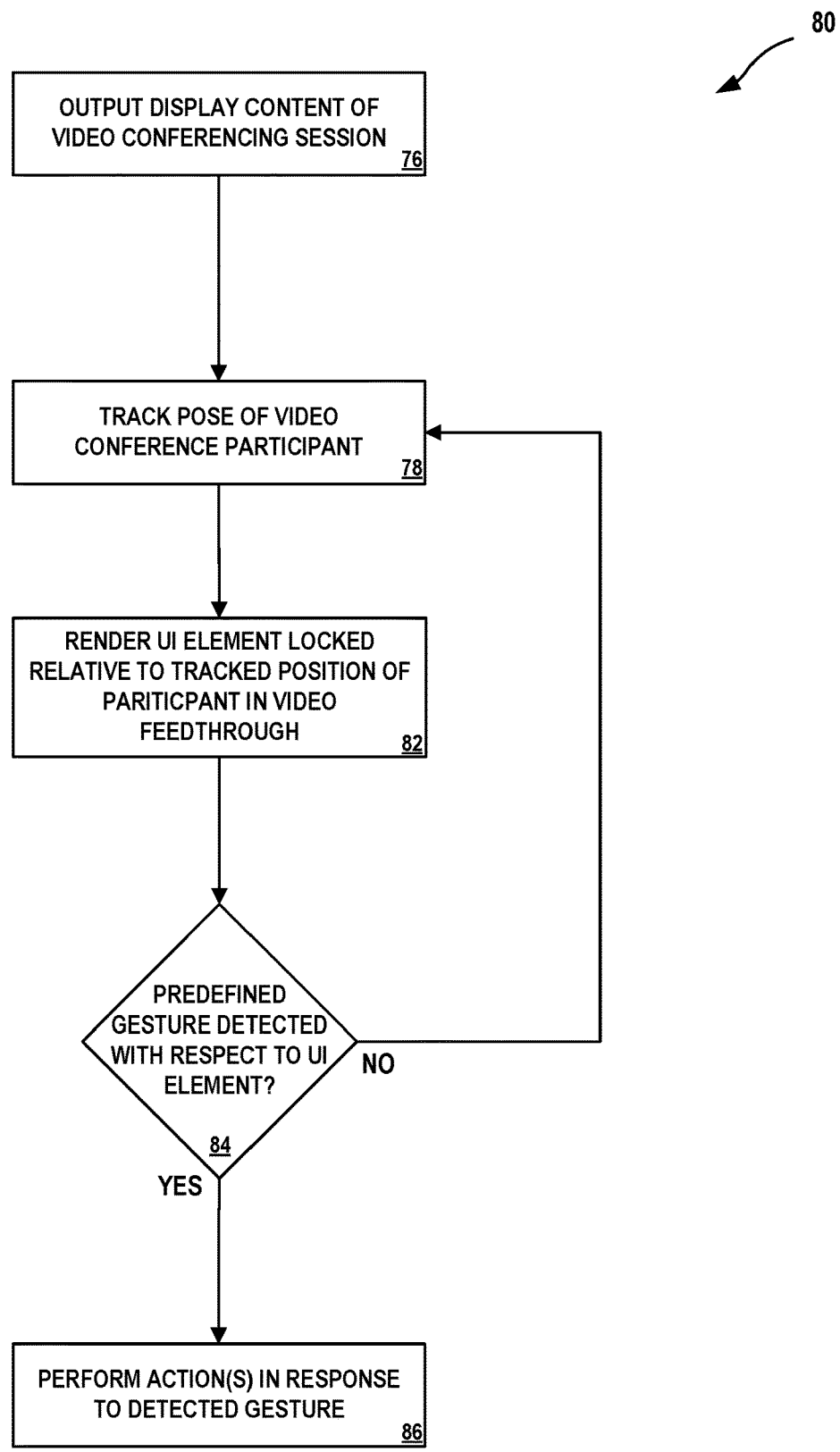
FIG. 9 is a flowchart illustrating an example process that the video conferencing device of FIGS. 1 and 2 may perform, in accordance with aspects of this disclosure.

FIG. 9 is a flowchart illustrating an example process 80 that video conferencing device 12 may perform, in accordance with aspects of this disclosure. While described as being performed by video presence device 12 (and components thereof) as an example, it will be appreciated that process 80 of this disclosure may be performed a variety of devices, systems, components, etc. According to process 80, video conferencing application 38 may cause rendering engine 42 to output display content 24 of a video conferencing session in progress (82). Video conferencing application may cause rendering engine 42 to overlay display content 24 with video feedthrough 26, which reflects the appearance of participant 30A as captured by image capture system 20A.

Pose tracker 46 may track the pose of participant 30A (78). UI element generator 44 may cause rendering engine 42 to render UI element 22 locked relative to the tracked pose of participant 30A (76). For example, the pose of participant 30A, as tracked by pose tracker 46, may reflect a body position and spatial orientation thereof, with respect to participant 30A. In turn, UI element generator 44 and rendering engine 42 may render UI element at a position within video feedthrough 26 that is locked relative to a particular pose aspect, such as above the left shoulder of avatar 30A', as in the examples of FIGS. 1 and 3.

Gesture detector 48 may determine whether or not a predefined gesture of gesture library 52 is detected within the boundary of UI element 22 (decision block 84). Non-limiting examples of predefined gestures for which gesture detector 48 may monitor with respect to UI element 22 (e.g., within the boundary of UI element 22 or within a threshold distance of UI element 22) are listed above, including a clenching gesture that ends with a first configuration of the clenching hand, flip gesture 70 that ends with an approximately 180-degree reflection (e.g., a turn motion around a vertical axis or y-axis) of the hand, poke gesture 66 described above, or any of various other gestures that are described by respective entries in gesture library 52.

If gesture detector 48 determines that none of the predefined gestures of gesture library 52 is detected with respect to UI element 22 (NO branch of decision block 84), pose tracker 46 continues to track the pose of participant 30A to assist in dynamic rendering of UI element 22 to simulate a personal assistant element, effectively iterating step 78. However, if gesture detector 48 determines that one of the predefined gestures of gesture library 52 is detected with respect to UI element 22 (YES branch of decision block 84), video conferencing application 38 may perform one or more predefined actions defined by entries in action library 54 (86).

To determine whether a predefined gesture is detected with respect to UI element 22, gesture detector 48 may determine whether the gesture is detected within the boundary of UI element 22, around or surrounding the boundary of UI element 22 (e.g., if grasp gesture 60 is performed surrounding the boundary of UI element 22), within a threshold distance of UI element 22, beginning outside and terminating with contact with the boundary of UI element 22 (e.g., as in the case of poke gesture 66), etc. Examples of actions that video conferencing application 58 may perform include gating an interactive menu in display content 24 or video feedthrough 26, adding another participant to the video conferencing session in progress, and various others.

Another example of an action that video conferencing application 58 may perform is to advance or scroll to a next page of a virtual book being viewed in a shared manner (e.g., a virtual storybook reading functionality provided by video conferencing application 38) over the video conferencing session, in response to gesture detector 48 detecting flip gesture 70 within the boundary of UI element 22. Yet another example of an action that video conferencing application 58 may perform is to simulate a knob-based functionality, such as to adjust audio volume levels (and/or audio fade/balance levels), adjust the setting of a virtual thermostat, etc. in response to detecting rotation gesture 72. In some granular implementations, video conferencing application 38 may alter the direction (e.g., increase/decrease, left/right, etc.) and/or attenuate the acuity of the adjustment, based on the direction and/or the magnitude of rotation gesture 72.

Figure 10:
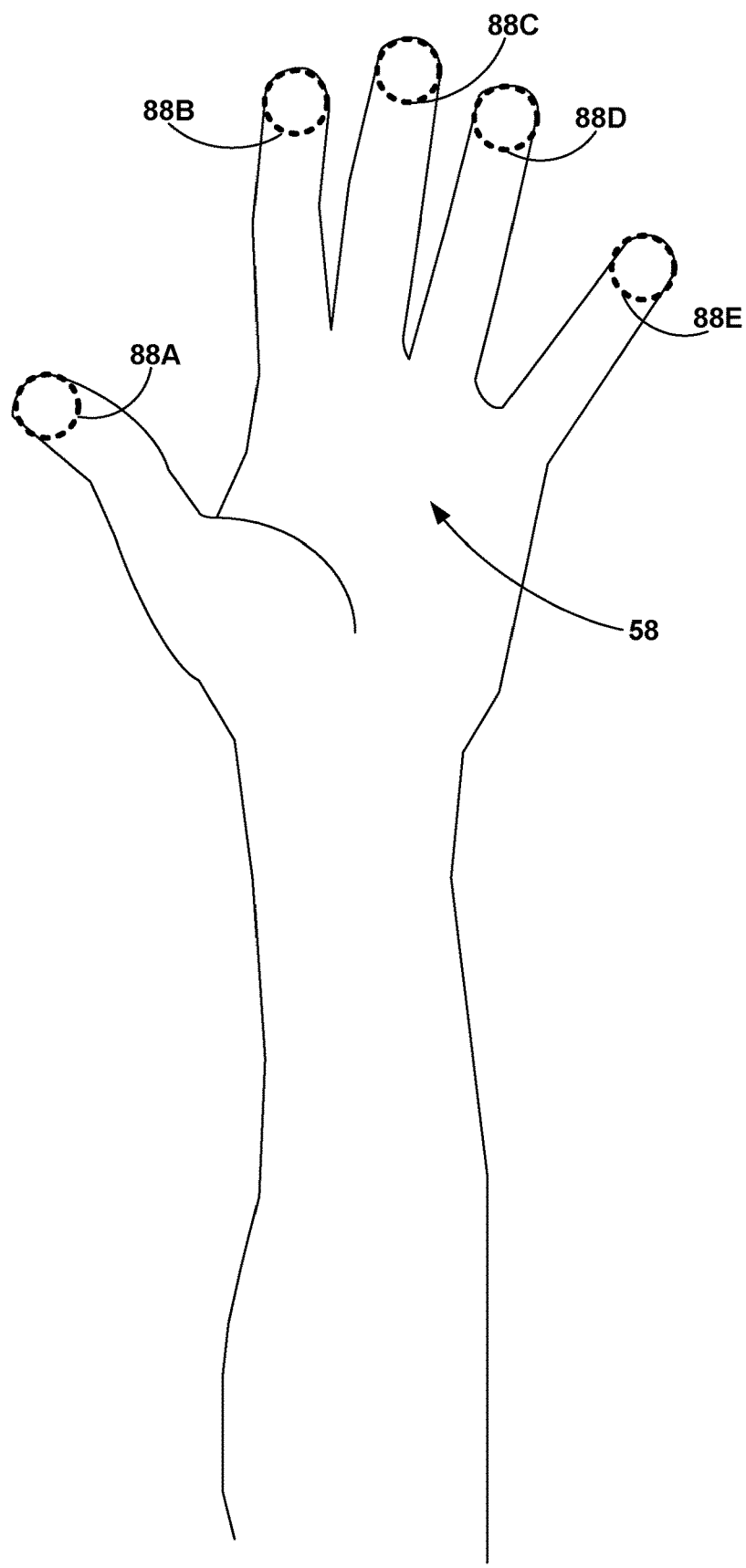
FIG. 10 is a conceptual diagram illustrating a multi-function implementation of the techniques described herein.

FIG. 10 is a conceptual diagram illustrating a multi-function implementation of the techniques described herein. In the example of FIG. 10, pose tracker 46 detects open hand configuration 58 based on the palm of the hand facing image capture system 20A, with at least a threshold. In response to pose tracker 46 detecting open hand configuration 58, UI element generator 44 generates a series of virtual buttons 88A-88E (collectively, "virtual buttons 88"). Rendering engine 42 renders virtual buttons 88 such that each of virtual buttons 88 is overlaid on a respective fingertip of the hand of participant 30A as displayed in video feedthrough 26.

Rendering engine 42 dynamically moves virtual buttons 88 to track, substantially in real time, any movements that pose tracker 46 detects with respect to the hand in the physical real-world environment. In this way, UI element generator 44 and rendering engine 42 output virtual buttons 88 in video feedthrough 26 such that virtual buttons 88 are visually locked to visual representations of individual fingers that are extended as part of open hand configuration 58. Video conferencing application 38 may invoke a different action of action library 54 in response to an activation of each one of virtual buttons 88. Gesture detector 48 may detect an activation of any of virtual buttons 88, on an individual basis, as described in further detail with respect to FIG. 11.

Figure 11:
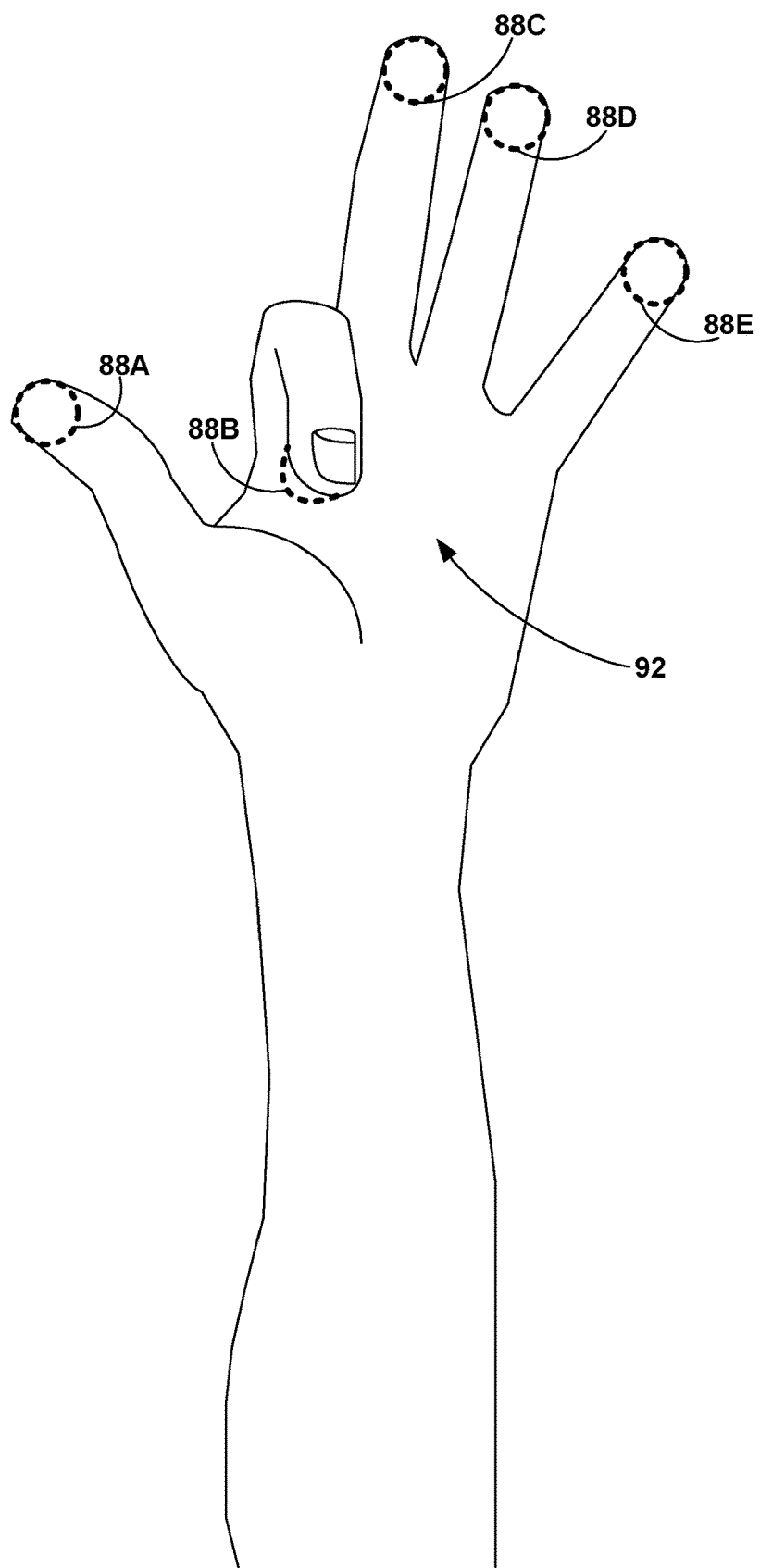
FIG. 11 is a conceptual diagram illustrating an activation of the virtual button of FIG. 10.

FIG. 11 is a conceptual diagram illustrating an activation of virtual button 88B of FIG. 10. Gesture detector 48 may identify the activation of virtual button 88B in response to detecting an adduction of the individual finger to which button 88B is visually locked, which in the case of FIGS. 10 and 11, is the index finger of the represented hand. The updated configuration of the hand is shown by way of partially open hand configuration 92. Video conferencing application 38 may invoke different actions stored to action library 54, in response to different ones of virtual buttons 88 being activated in the way shown in FIG. 11 with respect to the example of virtual button 88B. rendering engine 42 may fully or (as in the case of FIG. 11) partially occlude virtual button 88B upon rendering the index finger in folded, adduced form as part of partially open hand configuration 92, to keep with the visual locking of virtual button 88B to the index finger of the hand. Video conferencing application 38 may select factory-default options with respect to actions invoked in response to activation of each of virtual buttons 88, or may customize the actions based on user input, such as to add a particular participant to the video conferencing session (e.g., to simulate a user-specific "speed dial" with respect to particular contacts stored to or available to video conferencing system 12).

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), processing circuitry (e.g., fixed function circuitry, programmable circuitry, or any combination of fixed function circuitry and programmable circuitry) or equivalent discrete logic circuitry or integrated logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

As described by way of various examples herein, the techniques of the disclosure may include or be implemented in conjunction with a video communications system. The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some examples, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a video conferencing system, a mobile device or computing system, or any other hardware platform capable of providing artificial reality content to one or more viewers.

What is claimed is:

1. A video conferencing system comprising:
   an image capture system configured to capture input image data of a participant in a video conferencing session;
   a pose tracker configured to track a pose of the participant by tracking movement of the participant based on the captured input image data;
   a user interface (UI) element generator configured to generate a UI element;
   a rendering engine configured to:
     render, for display by the video conferencing system, output video data of the participant, and
     overlay, within the output video data, based on the pose of the participant, the UI element at a position locked relative to a position of a visual representation of the participant in the output video data such that the position of the UI element changes with any movement of the participant detected by the pose tracker;
   a gesture detector configured to detect, from the input image data, a gesture performed by the participant with respect to the rendered UI element; and
   a video conferencing application configured to perform an action in response to the gesture.

2. The video conferencing system of claim 1,
   wherein the gesture comprises a grasp gesture, and
   wherein to detect the gesture, the gesture detector is configured to detect, from the image data, a grasping motion of a hand to form a grasp configuration with respect to the overlaid UI element.

3. The video conferencing system of claim 1,
   wherein the predefined gesture is a hover gesture, and
   wherein to detect the hover gesture, the gesture detector is configured to detect, from the captured image data, an open hand configuration of a hand that is substantially stationary with respect to the overlaid UI element for at least a threshold period of time.

4. The video conferencing system of claim 1,
   wherein the gesture is a flip gesture, and
   wherein to detect the flip gesture, the gesture detector is configured to detect, from the captured image data, an approximately 180-degree turn of a hand with respect to the overlaid UI element.

5. The video conferencing system of claim 1,
wherein the gesture is a poke gesture, and
wherein to detect the poke gesture, the gesture detector is configured to detect, from the captured image data, an actuation motion of a hand in a pointing configuration with respect to the overlaid UI element.

6. The video conferencing system of claim 1,
wherein the gesture is a wave gesture, and
wherein to detect the wave gesture, the gesture detector is configured to detect, from the captured image data, a waving movement of a hand in an open hand configuration with respect to the overlaid UI element.

7. The video conferencing system of claim 1,
wherein the gesture is a rotation gesture, and
wherein to detect the rotation gesture, the gesture detector is configured to detect, from the captured image data, a radial movement of a hand with respect to the overlaid UI element.

8. The video conferencing system of claim 1, wherein to perform the action in response to the gesture being detected within the boundary of the overlaid UI element, the video conferencing application is configured to at least one of: (i) add an additional participant to the video conferencing session, (ii) attenuate an audio volume level of the video conferencing system, or (iii) scroll a text document that is shared via the video conferencing session.

9. The video conferencing system of claim 1, wherein to overlay the UI element at the position locked relative to the position of the participant, the rendering engine is configured to:
overlay the UI element locked relative to the visual representation of the participant presented within a video feedthrough rendered by the rendering engine; and
omit the UI element from a video conferencing feed transmitted to one or more remote computing devices actively connected to the video conferencing session.

10. The video conferencing system of claim 1, wherein the video conferencing system comprises at least one of a smartphone, a tablet computer, or a head-mounted device (HMD).

11. A method comprising:
capturing, by an image capture system of a video conferencing system, input image data of a participant in a video conferencing session;
tracking, by a pose tracker of the video conferencing system, a pose of the participant by tracking movement of the participant based on the captured input image data;
generating, by a user interface (UI) element generator of the video conferencing system, a UI element;
rendering, by a rendering engine of the video conferencing system, for display by the video conferencing system, output video data of the participant;
overlaying, by the rendering engine, within the output video data and based on the pose of the participant, the UI element at a position locked relative to a position of a visual representation of the participant in the output video data such that the position of the UI element changes with any movement of the participant detected by the pose tracker based on the captured video data;
detecting, by a gesture detector of the video conferencing system, from the input image data, a gesture performed by the participant with respect to the rendered UI element; and
performing, by a video conferencing application executing on the video conferencing system, an action in response to the gesture.

12. The method of claim 11,
wherein the gesture comprises a grasp gesture, and
wherein detecting the grasp gesture comprises detecting, by the gesture detector of the video conferencing system, from the image data, a grasping motion of a hand to form a grasp configuration with respect to the overlaid UI element.

13. The method of claim 11,
wherein the predefined gesture is a hover gesture, and
wherein detecting the hover gesture comprises detecting, by the gesture detector of the video conferencing system, from the captured image data, an open hand configuration of a hand that is substantially stationary with respect to the overlaid UI element for at least a threshold period of time.

14. The method of claim 11,
wherein the gesture is a flip gesture, and
wherein detecting the flip gesture comprises detecting, by the gesture detector of the video conferencing system, from the captured image data, an approximately 180-degree turn of a hand with respect to the overlaid UI element.

15. The method of claim 11,
wherein the gesture is a poke gesture, and
wherein detecting the poke gesture comprises detecting, by the gesture detector of the video conferencing system, from the captured image data, an actuation motion of a hand in a pointing configuration with respect to the overlaid UI element.

16. The method of claim 11,
wherein the gesture is a wave gesture, and
wherein detecting the wave gesture comprises detecting, by the gesture detector of the video conferencing system, from the captured image data, a waving movement of a hand in an open hand configuration with respect to the overlaid UI element.

17. The method of claim 11,
wherein the gesture is a rotation gesture, and
wherein detecting the rotation gesture comprises detecting, by the gesture detector of the video conferencing system, from the captured image data, a radial movement of a hand with respect to the overlaid UI element.

18. The method of claim 11, wherein performing the action in response to the gesture being detected within the boundary of the overlaid UI element, comprises at least one of: (i) adding, by the video conferencing application executing on the video conferencing system, an additional participant to the video conferencing session, (ii) attenuating, by the video conferencing application executing on the video conferencing system, an audio volume level of the video conferencing system, or (iii) scrolling, by the video conferencing application executing on the video conferencing system, a text document that is shared via the video conferencing session.

19. The method of claim 11, wherein overlaying the UI element at the position locked relative to the position of the participant comprises:
overlaying, by the rendering engine of the video conferencing system, the UI element locked relative to the visual representation of the participant presented within a video feedthrough rendered by the rendering engine; and
omitting, by the rendering engine, the UI element from a video conferencing feed transmitted to one or more remote computing devices actively connected to the video conferencing session.

20. A non-transitory computer-readable medium encoded with instructions that, when executed, cause processing circuitry of a video conferencing system to:
  capture, using an image capture system coupled to the video conferencing system, input image data of a participant in a video conferencing session;
  track a pose of the participant by tracking movement of the participant based on the captured input image data;
  generate a UI element;
  render output video data of the participant for display by the video conferencing system;
  overlay, within the output video data, based on the pose of the participant, the UI element at a position locked relative to a position of a visual representation of the participant in the output video data such that the position of the UI element changes with any movement of the participant as tracked based on the captured input image data;
  detect, from the input image data, a gesture performed by the participant with respect to the rendered UI element; and
  perform, via a video conferencing application executing on the video conferencing system, an action in response to the gesture.

21. The non-transitory computer-readable medium of claim 20, wherein the instructions that cause the processing circuitry to overlay the UI element at the position locked relative to the position of the participant comprise instructions that, when executed, cause the processing circuitry of the video conferencing system to:
  overlay the UI element locked relative to the visual representation of the participant presented within a video feedthrough rendered by the rendering engine; and
  omit the UI element from a video conferencing feed transmitted to one or more remote computing devices actively connected to the video conferencing session.

22. The video conferencing system of claim 1, wherein to track the movement of the participant based on the captured input image data, the pose tracker is configured to track changes in one or more of a location of the participant, a distance of the participant from a fixed location represented in the captured input image data, or an orientation of a body of the participant.

23. The method of claim 11, wherein tracking the movement of the participant based on the captured input image data comprises tracking, by the pose tracker, changes in one or more of a location of the participant, a distance of the participant from a fixed location represented in the captured input image data, or an orientation of a body of the participant.

* * * * *